(12) United States Patent
Ichikawa

(10) Patent No.: US 9,469,209 B2
(45) Date of Patent: Oct. 18, 2016

(54) VEHICULAR POWER RECEPTION DEVICE AND VEHICLE EQUIPPED WITH THE SAME, POWER SUPPLY APPARATUS, AND ELECTRIC POWER TRANSMISSION SYSTEM

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 14/358,650

(22) PCT Filed: Nov. 22, 2011

(86) PCT No.: PCT/JP2011/076859
§ 371 (c)(1),
(2), (4) Date: May 15, 2014

(87) PCT Pub. No.: WO2013/076803
PCT Pub. Date: May 30, 2013

(65) Prior Publication Data
US 2014/0327395 A1    Nov. 6, 2014

(51) Int. Cl.
*B60L 11/18* (2006.01)
*H02J 7/02* (2016.01)
*B60L 3/00* (2006.01)
*H02J 7/00* (2006.01)

(52) U.S. Cl.
CPC .............. *B60L 11/1838* (2013.01); *B60L 3/00* (2013.01); *B60L 11/182* (2013.01); *B60L 11/1816* (2013.01); *B60L 11/1861* (2013.01); *H02J 7/025* (2013.01); *B60L 2250/10* (2013.01); *H02J 2007/0096* (2013.01); *Y02T 10/7005* (2013.01); *Y02T 10/705* (2013.01); *Y02T 10/7044* (2013.01); *Y02T 10/7072* (2013.01); *Y02T 90/122* (2013.01); *Y02T 90/14* (2013.01); *Y02T 90/16* (2013.01)

(58) Field of Classification Search
CPC ...................................... Y02T 90/12
USPC ................................. 320/108, 109
See application file for complete search history.

(56) References Cited

U.S. PATENT DOCUMENTS 7,741,734 B2    6/2010 Joannopoulos et al.
8,884,581 B2 *  11/2014 Widmer et al. ....... B60L 11/182
                                                   320/104

(Continued)

FOREIGN PATENT DOCUMENTS

AU    2006269374 B2    1/2007
AU    2006269374 C1    1/2007

(Continued)

*Primary Examiner* — Edward Tso
*Assistant Examiner* — Ahmed Omar
(74) *Attorney, Agent, or Firm* — Oliff PLC

(57) ABSTRACT

A contact charging circuit composed of a charging inlet and a charger receives electric power from an outside power source via a charging cable. A non-contact charging circuit composed of a power reception unit, a rectifier, and a sensor unit receives electric power from an outside power source in a non-contact manner. A first communication device communicates contact charging information about power reception by the contact charging circuit with a third communication device of a power supply apparatus. A second communication device communicates non-contact charging information about power reception by the non-contact charging circuit with a fourth communication device of the power supply apparatus.

25 Claims, 11 Drawing Sheets

(56) References Cited

U.S. PATENT DOCUMENTS

| | | |
|---|---|---|
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2009/0306841 A1* | 12/2009 | Miwa et al. ........... B60K 6/445 701/22 |
| 2010/0065352 A1 | 3/2010 | Ichikawa |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2012/0043807 A1 | 2/2012 | Ichikawa |
| 2012/0056580 A1 | 3/2012 | Kai et al. |
| 2012/0306439 A1 | 12/2012 | Ichikawa et al. |

FOREIGN PATENT DOCUMENTS

| | | | |
|---|---|---|---|
| AU | 2007349874 A2 | 10/2008 | |
| AU | 2010200044 A1 | 1/2010 | |
| CA | 2 615 123 A1 | 1/2007 | |
| CA | 2 682 284 A1 | 10/2008 | |
| CN | 101258658 A | 9/2008 | |
| CN | 101682216 A | 3/2010 | |
| CN | 101860089 A | 10/2010 | |
| EP | 1 902 505 A2 | 3/2008 | |
| EP | 2 130 287 A1 | 12/2009 | |
| IN | 735/DELNP/2008 | 5/2008 | |
| IN | 6195/DELNP/2009 | 7/2010 | |
| JP | A-11-252810 | 9/1999 | |
| JP | A-2008-220130 | 9/2008 | |
| JP | A-2008-285075 | 11/2008 | |
| JP | A-2009-501510 | 1/2009 | |
| JP | A-2010-070048 | 4/2010 | |
| JP | WO 2010131348 A1 * | 11/2010 | ............ B60L 11/123 |
| JP | A-2010-288441 | 12/2010 | |
| KR | 2008-0031398 A | 4/2008 | |
| KR | 2010-0015954 A | 2/2010 | |
| WO | WO 2007/008646 A2 | 1/2007 | |
| WO | WO 2008/118178 A1 | 10/2008 | |
| WO | WO 2010/131348 A1 | 11/2010 | |
| WO | WO 2010/131349 A1 | 11/2010 | |

* cited by examiner

FIG.2

| INFORMATION | COMMUNICATION MEANS | CONCRETE EXAMPLES |
|---|---|---|
| CONTACT CHARGING INFORMATION | PLC | RATED CURRENT OF OUTLET, PRESENCE/ABSENCE OF GROUND, RELAY INFORMATION, ETC. |
| NON-CONTACT CHARGING INFORMATION | WIRELESS | RATED OUTPUT OF POWER SOURCE, POWER SOURCE STATUS, OUTPUT POWER, REFLECTED POWER, RECEIVED POWER, IMPEDANCE, POWER COMMAND, ETC. |
| COMMON INFORMATION | MEANS HAVING FASTER COMMUNICATION SPEED | SOC, RATED OUTPUT OF POWER SUPPLY APPARATUS, STATE OF POWER SUPPLY APPARATUS, ETC. |

FIG.11

| INFORMATION | COMMUNICATION MEANS | CONCRETE EXAMPLES |
|---|---|---|
| CONTACT CHARGING INFORMATION | PLC | RATED CURRENT OF OUTLET, PRESENCE/ABSENCE OF GROUND, RELAY INFORMATION, SOC, INFORMATION ON POWER SUPPLY APPARATUS SIDE, ETC. |
| NON-CONTACT CHARGING INFORMATION | WIRELESS | RATED OUTPUT OF POWER SOURCE, POWER SOURCE STATUS, OUTPUT POWER, REFLECTED POWER, RECEIVED POWER, IMPEDANCE, POWER COMMAND, SOC, INFORMATION ON POWER SUPPLY APPARATUS SIDE, ETC. |
| OTHER INFORMATION | MEANS HAVING FASTER COMMUNICATION SPEED | MUSIC INFORMATION, MAP INFORMATION, VEHICLE MAINTENANCE INFORMATION, BILLING INFORMATION, VEHICLE IDENTIFICATION INFORMATION (ID INFORMATION), INTERNET INFORMATION, ETC. |

FIG.12

| INFORMATION | COMMUNICATION MEANS | CONCRETE EXAMPLES |
|---|---|---|
| CONTACT CHARGING INFORMATION | PLC | RATED CURRENT OF OUTLET, PRESENCE/ABSENCE OF GROUND, RELAY INFORMATION, SOC, INFORMATION ON POWER SUPPLY APPARATUS SIDE, ETC. |
| NON-CONTACT CHARGING INFORMATION | WIRELESS | RATED OUTPUT OF POWER SOURCE, POWER SOURCE STATUS, OUTPUT POWER, REFLECTED POWER, RECEIVED POWER, IMPEDANCE, POWER COMMAND, SOC, INFORMATION ON POWER SUPPLY APPARATUS SIDE, ETC. |
| OTHER INFORMATION | OTHER MEANS (SUCH AS GSM, LAN) | MUSIC INFORMATION, MAP INFORMATION, VEHICLE MAINTENANCE INFORMATION, BILLING INFORMATION, VEHICLE IDENTIFICATION INFORMATION (ID INFORMATION), INTERNET INFORMATION, ETC. |

VEHICULAR POWER RECEPTION DEVICE AND VEHICLE EQUIPPED WITH THE SAME, POWER SUPPLY APPARATUS, AND ELECTRIC POWER TRANSMISSION SYSTEM

TECHNICAL FIELD

The present invention relates to a vehicular power reception device and a vehicle equipped with the same, a power supply apparatus, and an electric power transmission system. In particular, the present invention relates to a vehicular power reception device used for supplying electric power to a vehicle from a power supply apparatus outside the vehicle, the vehicle equipped with the same, the power supply apparatus, and an electric power transmission system.

BACKGROUND ART

Japanese Patent Laying-Open No. 2008-220130 (PTL 1) discloses a vehicular power system in which a power storage unit such as a secondary battery or an electric double layer capacitor is chargeable from a power source outside a vehicle. The vehicular power system includes conductive charging means charging the power storage unit by supplying and receiving electric power with the power system being electrically connected to the power source outside the vehicle (i.e., contact charging), inductive charging means charging the power storage unit by supplying and receiving electric power with the power system being magnetically coupled to the power source outside the vehicle (i.e., non-contact charging), and a charging control device selecting one of the conductive charging means and the inductive charging means.

According to the vehicular power system, since the power storage unit can be charged by selecting the contact charging using the conductive charging means or the non-contact charging using the inductive charging means, an area in which the power storage unit is chargeable can be expanded (see PTL 1).

CITATION LIST

Patent Document

PTD 1: Japanese Patent Laying-Open No. 2008-220130
PTD 2: International Publication No. 2010/131348
PTD 3: International Publication No. 2010/131349

SUMMARY OF INVENTION

Technical Problem

When a power storage device mounted in a vehicle is charged by a power supply apparatus outside the vehicle, it is necessary to communicate various information such as apparatus information, electric power information, and the state of charge (SOC) of the power storage device between the power supply apparatus and the vehicle. Thus, it is required to perform communication between the power supply apparatus and the vehicle as efficiently as possible. In particular, in a system capable of performing contact charging and non-contact charging as the vehicular power system described in Japanese Patent Laying-Open No. 2008-220130, a large amount of information is communicated between a power supply apparatus and a vehicle, and thus it is required to perform communication efficiently in accordance with charging means (contact charging and/or non-contact charging) used.

Accordingly, the present invention has been made to solve the aforementioned problem, and one object of the present invention is to provide a vehicular power reception device which establishes efficient communication between a vehicle and a power supply apparatus, the vehicle equipped with the same, the power supply apparatus, and an electric power transmission system.

Solution to Problem

According to the present invention, a vehicular power reception device is a vehicular power reception device for receiving electric power from a power source outside a vehicle (an outside power source), including a first power reception unit, a second power reception unit, a first communication unit, and a second communication unit. The first power reception unit receives the electric power from the outside power source via a power line. The second power reception unit receives the electric power from the outside power source in a non-contact manner. The first communication unit communicates first information about power reception by the first power reception unit with an outside of the vehicle. The second communication unit communicates second information about power reception by the second power reception unit with the outside of the vehicle.

Preferably, the vehicular power reception device further includes a control unit. The control unit controls the first and second communication units, when power reception from the outside power source is performed using both of the first and second power reception units, to communicate common information with the outside of the vehicle using only one of the first and second communication units, the common information being information in common with each other in information contained in the first information and information contained in the second information.

Preferably, the vehicular power reception device further includes a control unit. The control unit controls the first and second communication units, when communication with the outside of the vehicle is performed using both of the first and second communication units, to communicate common information with the outside of the vehicle using only one of the first and second communication units, the common information being information in common with each other in information contained in the first information and information contained in the second information.

Preferably, the control unit controls the first and second communication units to communicate the common information with the outside of the vehicle using one of the first and second communication units having a faster communication speed.

Preferably, the vehicular power reception device further includes a control unit. The control unit determines that a status of communication with the outside of the vehicle is abnormal when, concerning common information which is in common with each other in information contained in the first information and information contained in the second information, contents of the common information contained in the first information are different from contents of the common information contained in the second information in a case where the communication with the outside of the vehicle is performed using both of the first and second communication units.

Preferably, the vehicular power reception device further includes a control unit. The control unit controls the first and second communication units, when power reception from the outside power source is performed using both of the first and second power reception units, to communicate information other than information about the power reception from the outside power source with the outside of the vehicle using only one of the first and second communication units.

More preferably, the control unit controls the first and second communication units to communicate the information other than the information about the power reception from the outside power source with the outside of the vehicle using one of the first and second communication units having a faster communication speed.

Preferably, the first communication unit communicates with the outside of the vehicle via the power line. The second communication unit wirelessly communicates with the outside of the vehicle.

Preferably, information communicated by the first communication unit is different from information communicated by the second communication unit.

Preferably, the vehicular power reception device further includes a control unit. The control unit controls the first and second communication units to communicate with the outside of the vehicle using only the first communication unit when power reception from the outside power source is performed using only the first power reception unit, and to communicate with the outside of the vehicle using only the second communication unit when the power reception from the outside power source is performed using only the second power reception unit.

Preferably, the outside power source includes a power transmission unit transmitting the electric power to the second power reception unit in the non-contact manner. A difference between a natural frequency of the second power reception unit and a natural frequency of the power transmission unit is less than or equal to ±10% of the natural frequency of the second power reception unit or the natural frequency of the power transmission unit.

Preferably, the outside power source includes a power transmission unit transmitting the electric power to the second power reception unit in the non-contact manner. A coupling coefficient between the second power reception unit and the power transmission unit is less than or equal to 0.1.

Preferably, the outside power source includes a power transmission unit transmitting the electric power to the second power reception unit in the non-contact manner. The second power reception unit receives the electric power from the power transmission unit through at least one of a magnetic field and an electric field, the magnetic field being formed between the second power reception unit and the power transmission unit and oscillating at a specific frequency, the electric field being formed between the second power reception unit and the power transmission unit and oscillating at a specific frequency.

Further, according to the present invention, a vehicle is equipped with any of the vehicular power reception devices described above.

Further, according to the present invention, a power supply apparatus is a power supply apparatus for supplying electric power to a vehicle, including a first power transmission unit, a second power transmission unit, a first communication unit, and a second communication unit. The first power transmission unit transmits the electric power to the vehicle via a power line. The second power transmission unit transmits the electric power to the vehicle in a non-contact manner. The first communication unit communicates first information about power transmission by the first power transmission unit with the vehicle. The second communication unit communicates second information about power transmission by the second power transmission unit with the vehicle.

Preferably, the power supply apparatus further includes a control unit. The control unit controls the first and second communication units, when power transmission to the vehicle is performed using both of the first and second power transmission units, to communicate common information with the vehicle using only one of the first and second communication units, the common information being information in common with each other in information contained in the first information and information contained in the second information.

Preferably, the power supply apparatus further includes a control unit. The control unit controls the first and second communication units, when communication with the vehicle is performed using both of the first and second communication units, to communicate common information with the vehicle using only one of the first and second communication units, the common information being information in common with each other in information contained in the first information and information contained in the second information.

Preferably, the control unit controls the first and second communication units to communicate the common information with the vehicle using one of the first and second communication units having a faster communication speed.

Preferably, the power supply apparatus further includes a control unit. The control unit determines that a status of communication with the vehicle is abnormal when, concerning common information which is in common with each other in information contained in the first information and information contained in the second information, contents of the common information contained in the first information are different from contents of the common information contained in the second information in a case where the communication with the vehicle is performed using both of the first and second communication units.

Preferably, the power supply apparatus further includes a control unit. The control unit controls the first and second communication units, when power transmission to the vehicle is performed using both of the first and second power transmission units, to communicate information other than information about the power transmission to the vehicle with the vehicle using only one of the first and second communication units.

More preferably, the control unit controls the first and second communication units to communicate the information other than the information about the power transmission to the vehicle with the vehicle using one of the first and second communication units having a faster communication speed.

Preferably, the first communication unit communicates with the vehicle via the power line. The second communication unit wirelessly communicates with the vehicle.

Preferably, information communicated by the first communication unit is different from information communicated by the second communication unit.

Preferably, the vehicle further includes a control unit. The control unit controls the first and second communication units to communicate with the vehicle using only the first communication unit when power transmission to the vehicle is performed using only the first power transmission unit, and to communicate with the vehicle using only the second communication unit when the power transmission to the vehicle is performed using only the second power transmission unit.

Preferably, the power supply apparatus includes a power reception unit receiving the electric power from the second power transmission unit in the non-contact manner. A difference between a natural frequency of the second power transmission unit and a natural frequency of the power reception unit is less than or equal to ±10% of the natural frequency of the second power transmission unit or the natural frequency of the power reception unit.

Preferably, the vehicle includes a power reception unit receiving the electric power from the second power transmission unit in the non-contact manner. A coupling coefficient between the second power transmission unit and the power reception unit is less than or equal to 0.1.

Preferably, the vehicle includes a power reception unit receiving the electric power from the second power transmission unit in the non-contact manner. The second power transmission unit transmits the electric power to the power reception unit through at least one of a magnetic field and an electric field, the magnetic field being formed between the second power transmission unit and the power reception unit and oscillating at a specific frequency, the electric field being formed between the second power transmission unit and the power reception unit and oscillating at a specific frequency.

Further, according to the present invention, an electric power transmission system is an electric power transmission system transmitting electric power from a power supply apparatus to a vehicle. The power supply apparatus includes a first power transmission unit and a second power transmission unit. The first power transmission unit transmits the electric power to the vehicle via a power line. The second power transmission unit transmits the electric power to the vehicle in a non-contact manner. The vehicle includes a first power reception unit, a second power reception unit, a first communication unit, and a second communication unit. The first power reception unit receives the electric power from the first power transmission unit via the power line. The second power reception unit receives the electric power from the second power transmission unit in the non-contact manner. The first communication unit communicates first information about power reception by the first power reception unit with the power supply apparatus. The second communication unit communicates second information about power reception by the second power reception unit with the power supply apparatus.

Further, according to the present invention, an electric power transmission system is an electric power transmission system transmitting electric power from a power supply apparatus to a vehicle. The vehicle includes a first power reception unit and a second power reception unit. The first power reception unit receives the electric power from the power supply apparatus via a power line. The second power reception unit receives the electric power from the power supply apparatus in a non-contact manner. The power supply apparatus includes a first power transmission unit, a second power transmission unit, a first communication unit, and a second communication unit. The first power transmission unit transmits the electric power to the first power reception unit via the power line. The second power transmission unit transmits the electric power to the second power reception unit in the non-contact manner. The first communication unit communicates first information about power transmission by the first power transmission unit with the vehicle. The second communication unit communicates second information about power transmission by the second power transmission unit with the vehicle.

Advantageous Effects of Invention

According to the vehicular power reception device, since the first communication unit which communicates information about power reception by the first power reception unit with the outside of the vehicle and the second communication unit which communicates information about power reception by the second power reception unit with the outside of the vehicle are provided, efficient communication can be established between the vehicle and the outside power source in accordance with charging means (the first power reception unit and/or the second power reception unit) used, a charging environment, and the like.

Further, according to the power supply apparatus, since the first communication unit which communicates information about power transmission by the first power transmission unit with the vehicle and the second communication unit which communicates information about power transmission by the second power transmission unit with the vehicle are provided, efficient communication can be established between the power supply apparatus and the vehicle in accordance with power transmission means (the first power transmission unit and/or the second power transmission unit) used, a power transmission environment, and the like.

BRIEF DESCRIPTION OF DRAWINGS

FIG. 2 is a view showing exemplary information communicated between a vehicle and a power supply apparatus.

FIG. 11 is a view showing exemplary information communicated between a vehicle and a power supply apparatus in Embodiment 3.

FIG. 12 is a view showing exemplary information communicated between a vehicle and a power supply apparatus in a variation.

DESCRIPTION OF EMBODIMENTS

Figure 1:
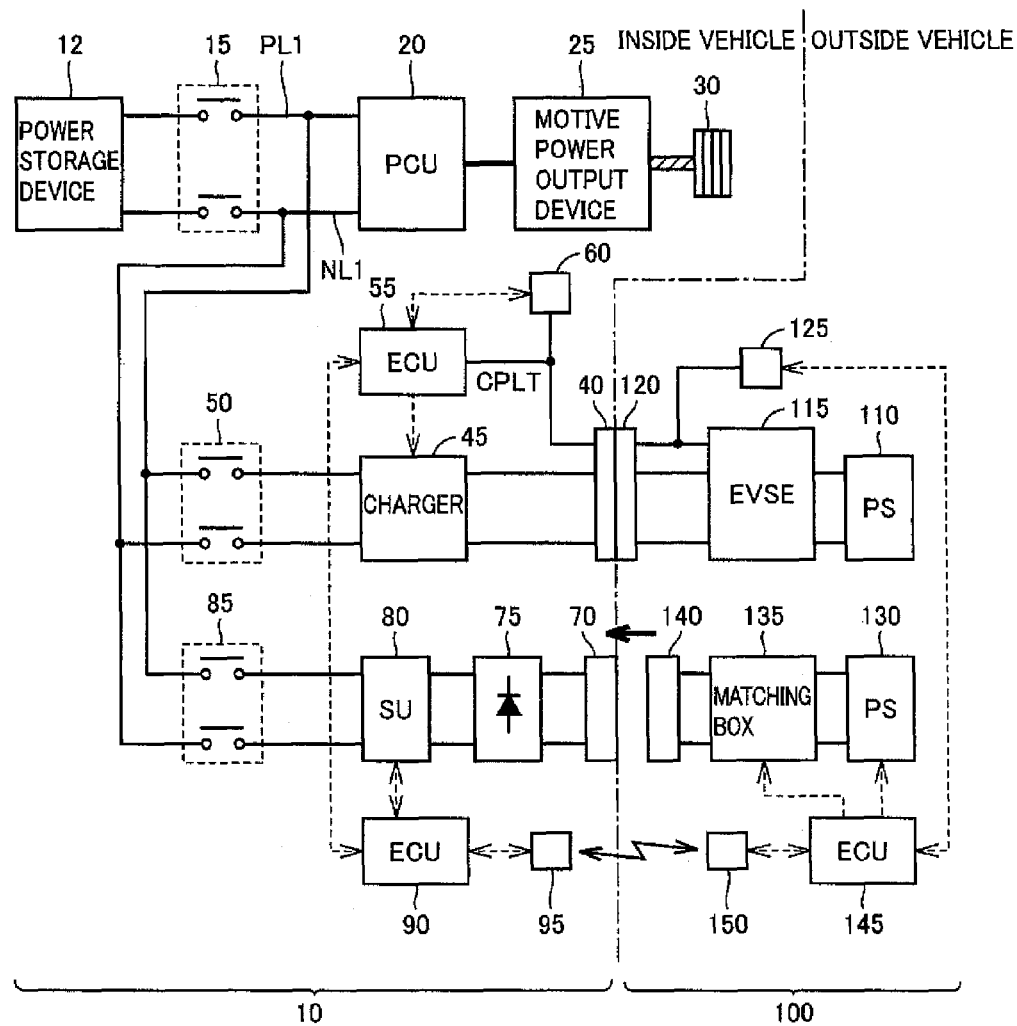
FIG. 1 is an overall configuration diagram of a vehicle charging system in accordance with Embodiment 1 of the present invention.

Hereinafter, embodiments of the present invention will be described in detail with reference to the drawings, in which identical or corresponding parts will be designated by the same reference numerals, and the description thereof will not be repeated.

[Embodiment 1]

FIG. 1 is an overall configuration diagram of a vehicle charging system in accordance with Embodiment 1 of the present invention. Referring to FIG. 1, the vehicle charging system includes a vehicle 10 and a power supply apparatus 100. Vehicle 10 includes a power storage device 12, a system main relay (hereinafter referred to as an "SMR") 15, a power control unit (hereinafter referred to as a "PCU") 20, a motive power output device 25, and drive wheels 30.

Power storage device 12 is a rechargeable direct-current (DC) power source, and is composed of, for example, a secondary battery such as a nickel hydride battery or a lithium ion battery. In power storage device 12, electric power supplied from outside power sources 110, 130 of power supply apparatus 100 and electric power generated in motive power output device 25 are stored. A large-capacity capacitor may also be adopted as power storage device 12. SMR 15 is provided between power storage device 12 and positive electrode line PL1, negative electrode line NL1. SMR 15 is a relay for electrically connecting/disconnecting power storage device 12 to/from positive electrode line PL1, negative electrode line NL1.

PCU 20 collectively indicates a power conversion device for receiving electric power from power storage device 12 and driving motive power output device 25. For example, PCU 20 includes an inverter for driving a motor included in motive power output device 25, a converter boosting electric power output from power storage device 12, and the like. Motive power output device 25 collectively indicates a device for driving drive wheels 30. For example, motive power output device 25 includes a motor driving drive wheels 30, an engine, and the like. Further, motive power output device 25 generates electric power by the motor driving drive wheels 30 during braking of the vehicle and the like, and outputs the generated electric power to PCU 20.

Vehicle 10 further includes a charging inlet 40, a charger 45, a first charging relay 50, a first electronic control unit (hereinafter referred to as a "first ECU") 55, and a first communication device 60.

Charging inlet 40 is configured to be connectable to a connector 120 of a charging cable supplying electric power from outside power source 110 of power supply apparatus 100 to vehicle 10. When power storage device 12 is charged by outside power source 110, charging inlet 40 receives the electric power supplied from outside power source 110 via the charging cable. Hereinafter, charging of power storage device 12 by outside power source 110 using the charging cable will also be referred to as "contact charging".

Charger 45 is connected to positive electrode line PL1, negative electrode line NL1 provided between SMR 15 and PCU 20, via first charging relay 50. When the contact charging is performed, charger 45 converts the electric power supplied from outside power source 110 into charging power for power storage device 12, based on a control signal from first ECU 55. Then, the electric power output from charger 45 is supplied to power storage device 12 to charge power storage device 12. First charging relay 50 is provided between charger 45 and positive electrode line PL1, negative electrode line NL1 to electrically connect/disconnect charger 45 to/from positive electrode line PL1, negative electrode line NL1.

First ECU 55 controls the contact charging by charger 45, through software processing performed by executing a pre-stored program in a CPU (Central Processing Unit) and/or hardware processing performed by dedicated electronic circuitry. Specifically, when the contact charging is performed, first ECU 55 performs an operation of turning on/off first charging relay 50 and a breaker included in EVSE (Electric Vehicle Supply Equipment) 115 of power supply apparatus 100. For the operation of EVSE 115, first ECU 55 remotely operates EVSE 115 by manipulating a potential of a pilot signal CPLT received from EVSE 115 via a control pilot line of the charging cable. Then, first ECU 55 generates a command to start/stop charger 45, a power command indicating a target value of the charging power, and the like, and outputs them to charger 45.

Further, when the contact charging is performed, first ECU 55 controls communication with power supply apparatus 100 by first communication device 60. Furthermore, when both of the contact charging and non-contact charging described later are performed, first ECU 55 controls the communication with power supply apparatus 100 by first communication device 60, in coordination with a second ECU 90 described later which controls the non-contact charging, such that communication between vehicle 10 and power supply apparatus 100 is efficiently performed. This will be described anew later.

First communication device 60 is a communication interface for communicating information about the contact charging with the outside of the vehicle (power supply apparatus 100) when the contact charging is performed. In Embodiment 1, first communication device 60 communicates with power supply apparatus 100 via the charging cable (such communication via the charging cable will also be referred to as "power line communication (PLC)"). As an example, first communication device 60 is connected to the control pilot line of the charging cable, and communicates with power supply apparatus 100 via the control pilot line.

Vehicle 10 further includes a power reception unit 70, a rectifier 75, a sensor unit 80, a second charging relay 85, second ECU 90, and a second communication device 95. Power reception unit 70 receives high-frequency alternating-current (AC) power output from a power transmission unit 140 of power supply apparatus 100 in a non-contact manner, when power storage device 12 is charged by outside power source 130 of power supply apparatus 100. Hereinafter, charging of power storage device 12 by outside power source 130 using power reception unit 70 and power transmission unit 140 will also be referred to as "non-contact charging".

Rectifier 75 rectifies the AC power received by power reception unit 70. Sensor unit 80 detects a received voltage and a received current output from rectifier 75, and outputs them to second ECU 90. Further, sensor unit 80 is provided with an adjustment resistor for keeping an impedance on the vehicle 10 side constant when adjustment control such as alignment and impedance matching between power reception unit 70 and power transmission unit 140 of power supply apparatus 100, which is performed prior to the non-contact charging, is performed. Second charging relay 85 is provided between sensor unit 80 and positive electrode line PL1, negative electrode line NL1 to electrically connect/disconnect sensor unit 80 to/from positive electrode line PL1, negative electrode line NL1.

It is noted that configurations of power reception unit 70 and sensor unit 80 will be described later, together with configurations of power transmission unit 140 and matching box 135 on the power supply apparatus 100 side, and non-contact electric power transmission from power transmission unit 140 to power reception unit 70.

Second ECU 90 performs the non-contact charging and the adjustment control, which is performed prior to the non-contact charging, through software processing performed by executing a prestored program in a CPU and/or hardware processing performed by dedicated electronic circuitry. Specifically, when the adjustment control is performed, second ECU 90 outputs a command to sensor unit 80 to connect the adjustment resistor in sensor unit 80 to a circuit. When the adjustment control is finished, second ECU 90 outputs an ON command to second charging relay 85.

Further, when the non-contact charging is performed, second ECU 90 controls communication with power supply apparatus 100 by second communication device 95. Furthermore, when both of the non-contact charging and the contact charging described above are performed, second ECU 90 controls the communication with power supply apparatus 100 by second communication device 95, in coordination with first ECU 55 which controls the contact charging, such that communication between vehicle 10 and power supply apparatus 100 is efficiently performed. This will be described in detail later.

Second communication device 95 is a communication interface for communicating information about the non-contact charging with the outside of the vehicle (power supply apparatus 100) when the non-contact charging is performed. Second communication device 95 wirelessly communicates with power supply apparatus 100.

On the other hand, power supply apparatus 100 includes outside power source 110, EVSE 115, connector 120, and a third communication device 125. Outside power source 110 is composed of, for example, a commercial system power source. However, outside power source 110 is not limited to a commercial system power source, and various power sources can be applied. EVSE 115 is configured to be capable of breaking an electrical path for supplying electric power from outside power source 110 to vehicle 10. EVSE 115 is provided in, for example, the charging cable for supplying electric power from outside power source 110 to vehicle 10, or a charging stand for supplying electric power to vehicle 10 via the charging cable.

Further, EVSE 115 generates pilot signal CPLT for exchanging predetermined information between EVSE 115 and vehicle 10 when the contact charging is performed, and outputs it to vehicle 10 via the control pilot line. It is noted that the potential of pilot signal CPLT is manipulated in first ECU 55 of vehicle 10, and EVSE 115 switches connection/breaking of the charging electrical path based on the potential of pilot signal CPLT.

Connector 120 is connected to the charging cable including the control pilot line, and is configured to be capable of fitting into charging inlet 40 of vehicle 10. Third communication device 125 is a communication interface for communicating the information about the contact charging with vehicle 10 when the contact charging is performed. In Embodiment 1, third communication device 125 communicates with vehicle 10 via the charging cable. As an example, third communication device 125 is connected to the control pilot line of the charging cable, and communicates with first communication device 60 of vehicle 10 via the control pilot line.

Power supply apparatus 100 further includes outside power source 130, matching box 135, power transmission unit 140, a third ECU 145, and a fourth communication device 150. Outside power source 130 generates AC power having a predetermined frequency. As an example, outside power source 130 receives electric power from a commercial system power source, and generates high-frequency AC power. It is noted that outside power sources 110, 130 may be configured as one power source apparatus.

Matching box 135 is provided between outside power source 130 and power transmission unit 140, and is configured to be capable of changing an impedance therein. As an example, matching box 135 is composed of variable capacitors and a coil, and can change the impedance by changing capacitances of the variable capacitors. By changing the impedance in matching box 135, the impedance of power supply apparatus 100 can be matched to the impedance of vehicle 10 (impedance matching). It is noted that, in a case where outside power source 130 has a function of matching the impedances, matching box 135 can be omitted.

Power transmission unit 140 receives supply of the high-frequency AC power from outside power source 130. Then, power transmission unit 140 outputs electric power to power reception unit 70 of vehicle 10 in the non-contact manner, via an electromagnetic field generated around power transmission unit 140. It is noted that the configurations of power transmission unit 140 and matching box 135 will be described later, together with the configurations of power reception unit 70 and sensor unit 80 on the vehicle 10 side, and the non-contact electric power transmission from power transmission unit 140 to power reception unit 70.

Fourth communication device 150 is a communication interface for communicating the information about the non-contact charging with vehicle 10 when the non-contact charging is performed. Fourth communication device 150 wirelessly communicates with vehicle 10.

Third ECU 145 controls outside power source 130 and matching box 135, through software processing performed by executing a prestored program in a CPU and/or hardware processing performed by dedicated electronic circuitry. Specifically, when the adjustment control, which is performed prior to performing the non-contact charging, is performed, third ECU 145 controls outside power source 130 to output adjustment power smaller than charging power for charging power storage device 12, and controls matching box 135 to perform impedance matching. Thereafter, third ECU 145 controls outside power source 130 to output the charging power for charging power storage device 12.

Further, when the contact charging is performed, third ECU 145 controls communication with vehicle 10 by third communication device 125. Furthermore, when the non-contact charging is performed, third ECU 145 controls communication with vehicle 10 by fourth communication device 150. In addition, when both of the contact charging and the non-contact charging are performed, third ECU 145 controls the communication with vehicle 10 by third communication device 125 and fourth communication device 150, such that communication between power supply apparatus 100 and vehicle 10 is efficiently performed.

In the vehicle charging system, the contact charging using charging inlet 40 and charger 45 and the non-contact charging using power transmission unit 140 and power reception unit 70 can be performed. During the contact charging and/or the non-contact charging, communication is performed between vehicle 10 and power supply apparatus 100 using first communication device 60 and second communication device 95 of vehicle 10 and third communication device 125 and fourth communication device 150 of power supply apparatus 100.

First communication device 60 of vehicle 10 and third communication device 125 of power supply apparatus 100 communicate information about the contact charging (hereinafter also referred to as "contact charging information") with each other, via the charging cable (control pilot line).

On the other hand, second communication device 95 of vehicle 10 and fourth communication device 150 of power supply apparatus 100 wirelessly communicate information about the non-contact charging (hereinafter also referred to as "non-contact charging information") with each other.

Here, the contact charging information and the non-contact charging information contain information which is in common with each other (hereinafter also referred to as "common information") (for example, the SOC of power storage device 12, and the like). In addition, in Embodiment 1, when power supply from power supply apparatus 100 to vehicle 10 is performed using both of the contact charging and the non-contact charging, the common information is communicated using one of the communication using first communication device 60 and third communication device 125 (PLC) and wireless communication using second communication device 95 and fourth communication device 150. Preferably, communication is performed using communication means having a faster communication speed.

FIG. 2 is a view showing exemplary information communicated between vehicle 10 and power supply apparatus 100. Referring to FIG. 2, the contact charging information communicated between first communication device 60 and third communication device 125 (through PLC) contains information about the contact charging, for example, information about the rated current of an outlet, presence/absence of a ground, opening/closing of the breaker included in EVSE 115, and the like.

Further, the non-contact charging information wirelessly communicated between second communication device 95 and fourth communication device 150 contains information about the non-contact charging, for example, information about the rated output on the power source side, a power source status (state), output power, reflected power, received power, impedance, power command, and the like.

In addition, the common information which is in common in the contact charging information and the non-contact charging information contains, for example, the SOC of power storage device 12, the rated output of power supply apparatus 100, the state of power supply apparatus 100, and the like. When power supply from power supply apparatus 100 to vehicle 10 is performed using both of the contact charging and the non-contact charging, the common information is communicated between vehicle 10 and power supply apparatus 100 using one of the PLC and the wireless communication which has a faster communication speed, the PLC using first communication device 60 and third communication device 125 and the wireless communication using second communication device 95 and fourth communication device 150. It is noted that using both of the contact charging and the non-contact charging is not limited to a case where the contact charging and the non-contact charging are simultaneously performed, and a charging period of the contact charging does not necessarily have to overlap with a charging period of the non-contact charging. Further, at least a portion of the common information may be communicated using only one of the PLC by first communication device 60 and third communication device 125 and the wireless communication by second communication device 95 and fourth communication device 150.

When only the contact charging is performed, the common information is communicated using the PLC by first communication device 60 and third communication device 125, together with the contact charging information. On the other hand, when only the non-contact charging is performed, the common information is wirelessly communicated by second communication device 95 and fourth communication device 150, together with the non-contact charging information.

Figure 3:
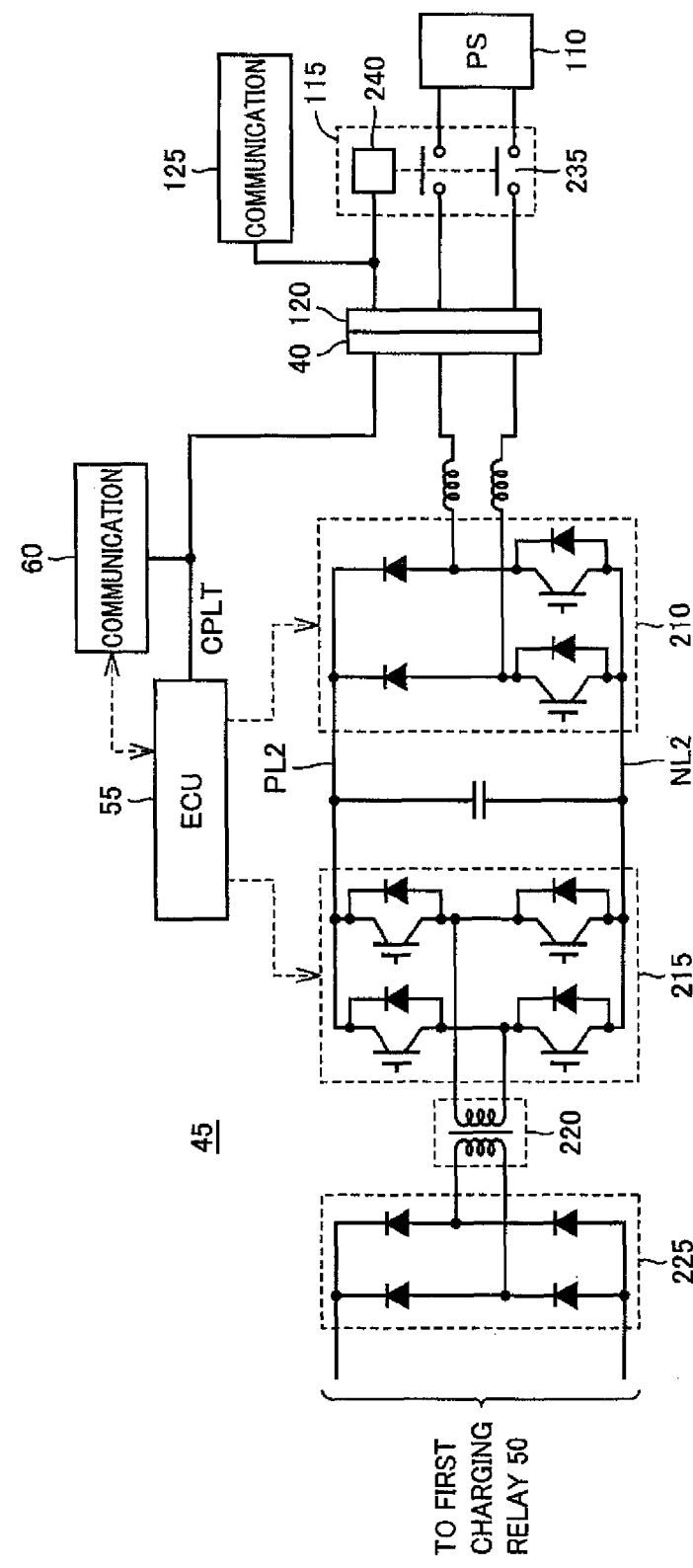
FIG. 3 is a circuit diagram of a charger and an EVSE shown in FIG. 1.

FIG. 3 is a circuit diagram of charger 45 and EVSE 115 shown in FIG. 1. Referring to FIG. 3, charger 45 includes an AC/DC conversion unit 210, a DC/AC conversion unit 215, an insulating transformer 220, and a rectification unit 225.

AC/DC conversion unit 210 converts AC power supplied from outside power source 110 into DC power and outputs the DC power to DC/AC conversion unit 215, based on a control signal from first ECU 55. It is noted that AC/DC conversion unit 210 and a reactor provided on an input side of AC/DC conversion unit 210 can constitute a boost chopper circuit to boost electric power input from charging inlet 40. DC/AC conversion unit 215 converts the DC power received from AC/DC conversion unit 210 into AC power and outputs the AC power to insulating transformer 220, based on a control signal from first ECU 55. DC/AC conversion unit 215 is composed of, for example, a single-phase bridge circuit.

Insulating transformer 220 includes a core made of a magnetic material, and a primary coil and a secondary coil wound around the core. The primary coil and the secondary coil are electrically insulated from each other, and are connected to DC/AC conversion unit 215 and rectification unit 225, respectively. Insulating transformer 220 converts the AC power from DC/AC conversion unit 215 to have a voltage in accordance with a turn ratio between the primary coil and the secondary coil, and outputs the AC power to rectification unit 225. Rectification unit 225 converts the AC power received from insulating transformer 220 into DC power and outputs the DC power to first charging relay 50.

It is noted that AC/DC conversion unit 210 and rectification unit 225 may each be composed of a single-phase bridge circuit capable of performing power conversion bi-directionally. This also allows vehicle 10 to output electric power to the outside of the vehicle.

On the other hand, EVSE 115 includes a CCID (Charging Circuit Interrupt Device) 235 and a CPLT control device 240. CCID 235 is a breaker provided in a power supply path from outside power source 110 to vehicle 10, and is controlled by CPLT control device 240. CPLT control device 240 generates pilot signal CPLT for exchanging predetermined information between EVSE 115 and vehicle 10 when the contact charging is performed, and outputs it to vehicle 10 via the control pilot line.

The potential of pilot signal CPLT is manipulated in first ECU 55 of vehicle 10, and CPLT control device 240 controls CCID 235 based on the potential of pilot signal CPLT. Specifically, CCID 235 can be remotely operated from vehicle 10 by manipulating the potential of pilot signal CPLT in vehicle 10. It is noted that pilot signal CPLT conforms to, for example, "SAE J1772 (SAE Electric Vehicle Conductive Charge Coupler)" in the United States.

First communication device 60 of vehicle 10 is connected to the control pilot line, through which pilot signal CPLT is exchanged, on the vehicle 10 side, and third communication device 125 of power supply apparatus 100 is connected to the control pilot line on the power supply apparatus 100 side.

Thereby, when the contact charging is performed, the information about the contact charging is communicated between first communication device 60 and third communication device 125 via the charging cable (control pilot line).

Figure 4:
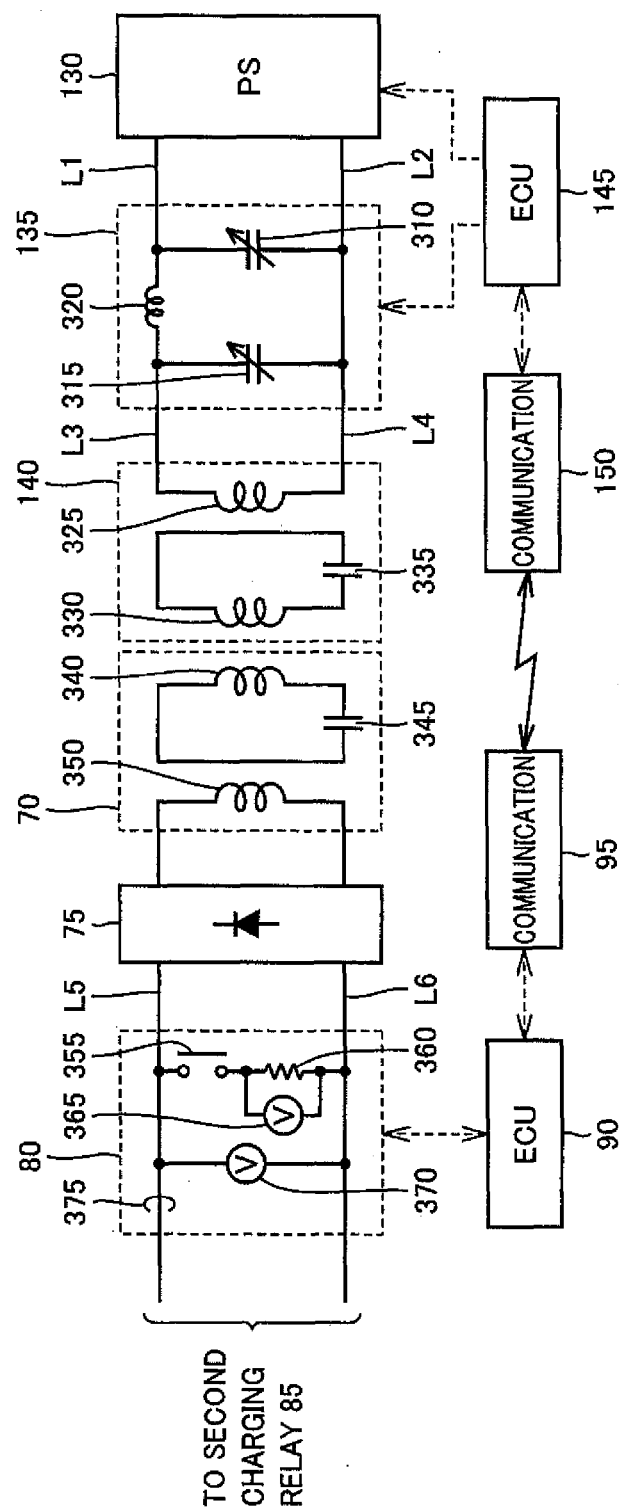
FIG. 4 is a circuit diagram of a power reception unit and a sensor unit, and a matching box and a power transmission unit shown in FIG. 1.

FIG. 4 is a circuit diagram of power reception unit 70 and sensor unit 80, and matching box 135 and power transmission unit 140 shown in FIG. 1. Referring to FIG. 4, power reception unit 70 includes coils 340, 350 and a capacitor 345. Coil 340 and capacitor 345 form an LC resonance circuit to receive electric power transmitted from power transmission unit 140 in the non-contact manner. Coil 350 takes out high-frequency power received by coil 340 from coil 340 by electromagnetic induction, and outputs it to rectifier 75. Rectifier 75 rectifies the received high-frequency power output from coil 350, and outputs it to power lines L5, L6.

Sensor unit 80 includes a relay 355, an adjustment resistor 360, voltage sensors 365, 370, and a current sensor 375. Relay 355 and adjustment resistor 360 are connected in series between power lines L5 and L6. Relay 355 is turned on (i.e., becomes conductive) when the adjustment control, which is performed prior to performing the non-contact charging, is performed. Thereby, the impedance on the vehicle 10 side at the time of the adjustment control becomes constant, and the adjustment control can be efficiently performed.

Voltage sensor 365 detects a voltage of adjustment resistor 360, and outputs it to second ECU 90. Voltage sensor 370 detects a voltage between power lines L5 and L6, i.e., a charging voltage for power storage device 12 at the time of the non-contact charging, and outputs a detected value thereof to second ECU 90. Current sensor 375 detects a current flowing through power line L5 (or power line L6), i.e., a charging current for power storage device 12 at the time of the non-contact charging, and outputs a detected value thereof to second ECU 90.

On the other hand, matching box 135 of power supply apparatus 100 includes variable capacitors 310, 315 and a coil 320. Matching box 135 can change the impedance by changing capacitances of variable capacitors 310, 315. By changing the impedance in matching box 135, the impedance of power supply apparatus 100 can be matched to the impedance of vehicle 10 (impedance matching).

Power transmission unit 140 includes coils 325, 330 and a capacitor 335. Coil 325 supplies coil 330 with high-frequency AC power output from outside power source 130, by electromagnetic induction. Coil 330 and capacitor 335 form an LC resonance circuit to transmit electric power to power reception unit 70 of vehicle 10 in the non-contact manner.

It is noted that coil 350 is provided in power reception unit 70 to facilitate taking-out of electric power from coil 340, and rectifier 75 may be directly connected to coil 340 without providing coil 350. Further, capacitor 345 is provided in power reception unit 70 to adjust a natural frequency of the resonance circuit, and capacitor 345 may not be provided in a case where a desired natural frequency is obtained using a stray capacitance of coil 340.

In addition, coil 325 is provided in power transmission unit 140 to facilitate power supply from outside power source 130 to coil 330, and matching box 135 may be directly connected to coil 330 without providing coil 325. Further, capacitor 335 is provided in power transmission unit 140 to adjust a natural frequency of the resonance circuit, and capacitor 335 may not be provided in a case where a desired natural frequency is obtained using a stray capacitance of coil 330.

Hereinafter, the non-contact electric power transmission from power transmission unit 140 to power reception unit 70 will be described in detail. In the electric power transmission system, a difference between a natural frequency of power transmission unit 140 and a natural frequency of power reception unit 70 is less than or equal to ±10% of the natural frequency of power transmission unit 140 or the natural frequency of power reception unit 70. Electric power transmission efficiency can be improved by setting the natural frequencies of power transmission unit 140 and power reception unit 70 in such a range. On the other hand, if the above difference between the natural frequencies is more than ±10%, electric power transmission efficiency becomes less than 10%, causing problems such as an increased electric power transmission time.

It is noted that the natural frequency of power transmission unit 140 (power reception unit 70) refers to an oscillation frequency at which an electrical circuit (resonance circuit) constituting power transmission unit 140 (power reception unit 70) freely oscillates. A resonance frequency of power transmission unit 140 (power reception unit 70) refers to a natural frequency obtained when a braking force or an electric resistance is set to zero in the electrical circuit (resonance circuit) constituting power transmission unit 140 (power reception unit 70).

Figure 5:
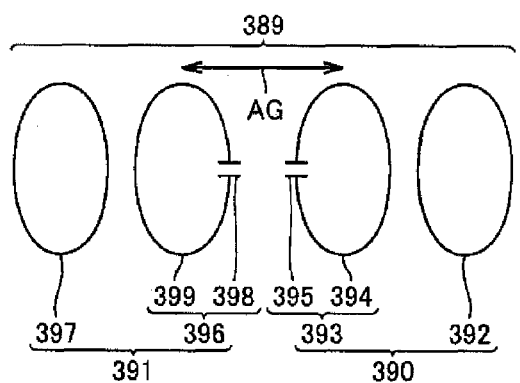
FIG. 5 is a view showing a simulation model of an electric power transmission system.
Figure 6:
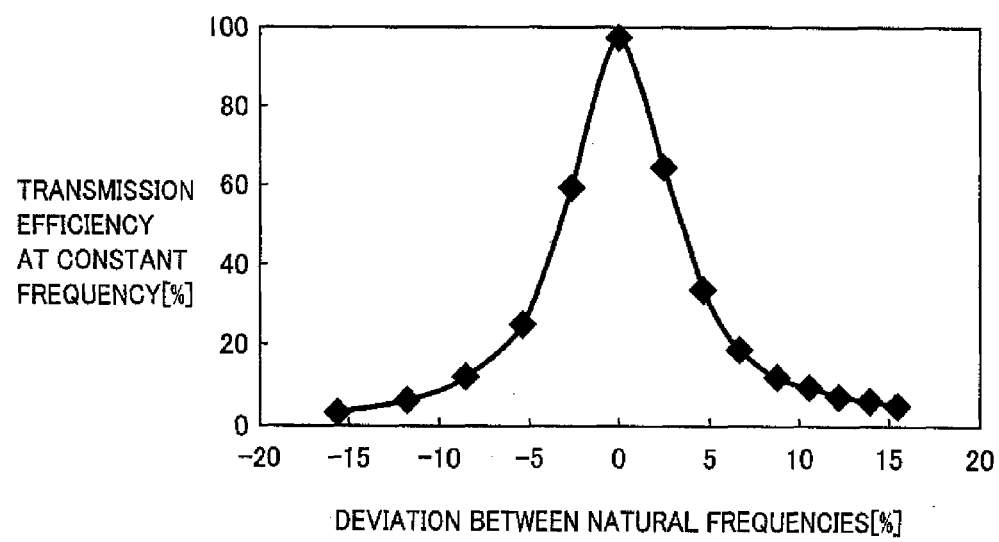
FIG. 6 is a view showing the relation between deviation between natural frequencies of the power transmission unit and the power reception unit and electric power transmission efficiency.

The result of a simulation for analyzing the relation between the difference between the natural frequencies and electric power transmission efficiency will be described with reference to FIGS. 5 and 6. FIG. 5 is a view showing a simulation model of the electric power transmission system. FIG. 6 is a view showing the relation between deviation between the natural frequencies of the power transmission unit and the power reception unit and electric power transmission efficiency.

Referring to FIG. 5, an electric power transmission system 389 includes a power transmission unit 390 and a power reception unit 391. Power transmission unit 390 includes a first coil 392 and a second coil 393. Second coil 393 includes a resonance coil 394 and a capacitor 395 provided in resonance coil 394. Power reception unit 391 includes a third coil 396 and a fourth coil 397. Third coil 396 includes a resonance coil 399 and a capacitor 398 connected to resonance coil 399.

It is assumed that resonance coil 394 has an inductance Lt, capacitor 395 has a capacitance C1, resonance coil 399 has an inductance Lr, and capacitor 398 has a capacitance C2. When each parameter is set as described above, a natural frequency f1 of second coil 393 is expressed by the following equation (1), and a natural frequency f2 of third coil 396 is expressed by the following equation (2):

$$f1 = 1/\{2\pi(Lt \times C1)^{1/2}\} \tag{1}$$

$$f2 = 1/\{2\pi(Lr \times C2)^{1/2}\} \tag{2}$$

Here, FIG. 6 shows the relation between deviation between the natural frequencies of second coil 393 and third coil 396 and electric power transmission efficiency in a case where inductance Lr and capacitances C1, C2 are fixed and only inductance Lt is changed. It is noted that, in this simulation, the relative positional relation between resonance coil 394 and resonance coil 399 is fixed, and a current supplied to second coil 393 has a constant frequency.

In the graph shown in FIG. 6, the axis of abscissas represents deviation between the natural frequencies (%), and the axis of ordinates represents electric power transmission efficiency (%) at a constant frequency. The deviation between the natural frequencies (%) is expressed by the following equation (3):

$$(\text{Deviation between the natural frequencies}) = \{(f1-f2)/f2\} \times 100(\%) \quad (3).$$

As can be seen from FIG. 6, when the deviation between the natural frequencies (%) is 0%, electric power transmission efficiency is close to 100%. When the deviation between the natural frequencies (%) is ±5%, electric power transmission efficiency is approximately 40%. When the deviation between the natural frequencies (%) is ±10%, electric power transmission efficiency is approximately 10%. When the deviation between the natural frequencies (%) is ±15%, electric power transmission efficiency is approximately 5%. That is, it can be seen that electric power transmission efficiency can be improved to a practical level by setting the natural frequencies of second coil 393 and third coil 396 such that the absolute value of the deviation between the natural frequencies (%) (i.e., the difference between the natural frequencies) is in the range of less than or equal to 10% of the natural frequency of third coil 396. Further, when the natural frequencies of second coil 393 and third coil 396 are set such that the absolute value of the deviation between the natural frequencies (%) is less than or equal to 5% of the natural frequency of third coil 396, electric power transmission efficiency can be further improved, which is more preferable. It is noted that an electromagnetic field analysis software (JMAG (registered trademark) manufactured by JSOL Corporation) is employed as simulation software.

Referring to FIG. 4 again, power transmission unit 140 and power reception unit 70 supply and receive electric power in the non-contact manner through at least one of a magnetic field and an electric field, the magnetic field being formed between power transmission unit 140 and power reception unit 70 and oscillating at a specific frequency, the electric field being formed between power transmission unit 140 and power reception unit 70 and oscillating at a specific frequency. Preferably, a coupling coefficient κ between power transmission unit 140 and power reception unit 70 is less than or equal to 0.1. It is noted that coupling coefficient κ is not limited to this range, and may have various values which improve electric power transmission. Electric power is transmitted from power transmission unit 140 to power reception unit 70 by resonating power transmission unit 140 and power reception unit 70 by an electromagnetic field.

As described above, in the electric power transmission system, electric power is transmitted between power transmission unit 140 and power reception unit 70 in the non-contact manner by resonating power transmission unit 140 and power reception unit 70 by the electromagnetic field. Such coupling between power transmission unit 140 and power reception unit 70 in electric power transmission is referred to as, for example, "magnetic resonance coupling", "magnetic field resonance coupling", "electromagnetic field resonance coupling", "electric field resonance coupling", and the like. "Electromagnetic field resonance coupling" means coupling including all of "magnetic resonance coupling", "magnetic field resonance coupling", and "electric field resonance coupling".

In a case where power transmission unit 140 and power reception unit 70 are formed of coils as described above, power transmission unit 140 and power reception unit 70 are coupled mainly by a magnetic field, and "magnetic resonance coupling" or "magnetic field resonance coupling" is formed. It is noted that, for example, an antenna such as a meander line can be adopted in power transmission unit 140 and power reception unit 70. In this case, power transmission unit 140 and power reception unit 70 are coupled mainly by an electric field, and "electric field resonance coupling" is formed.

Figure 7:
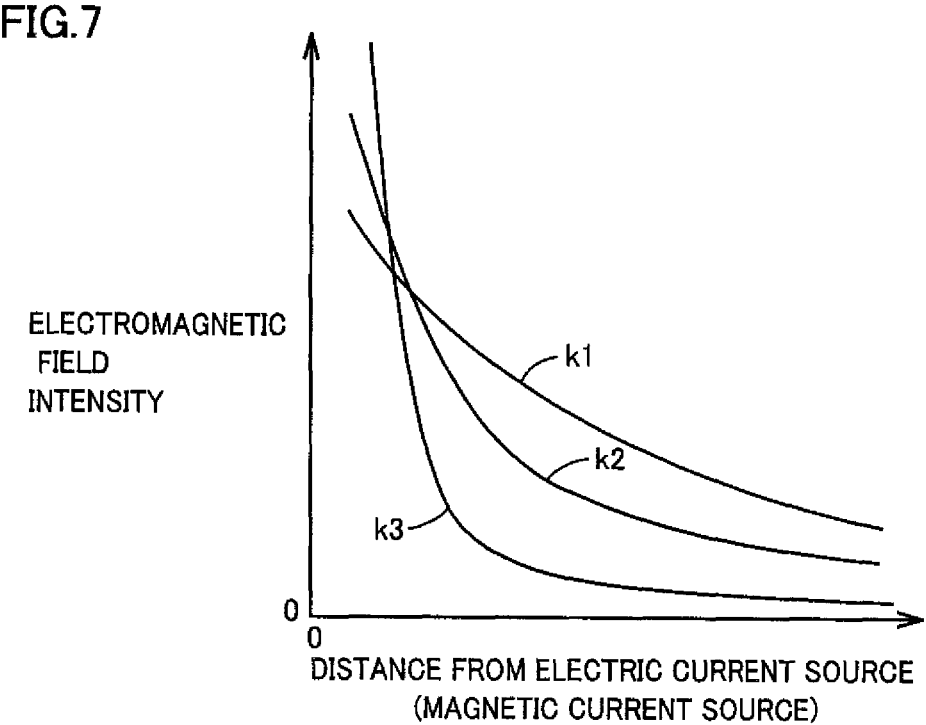
FIG. 7 is a view showing the relation between the distance from an electric current source (magnetic current source) and the intensity of an electromagnetic field.

FIG. 7 is a view showing the relation between the distance from an electric current source (magnetic current source) and the intensity of an electromagnetic field. Referring to FIG. 7, the electromagnetic field mainly includes three components. A curve k1 is a component in inverse proportion to the distance from a wave source, and is referred to as a "radiation electromagnetic field". A curve k2 is a component in inverse proportion to the square of the distance from the wave source, and is referred to as an "inductive electromagnetic field". A curve k3 is a component in inverse proportion to the cube of the distance from the wave source, and is referred to as a "static electromagnetic field".

The "static electromagnetic field" is a region in which the intensity of an electromagnetic wave sharply decreases with distance from the wave source. In the resonance method, energy (electric power) is transmitted using a near field (evanescent field) in which the "static electromagnetic field" is dominant. Specifically, by resonating a pair of resonators (for example, a pair of resonance coils) having natural frequencies close to each other in the near field in which the "static electromagnetic field" is dominant, energy (electric power) is transmitted from one resonator (primary-side resonance coil) to the other resonator (secondary-side resonance coil). Since the "static electromagnetic field" does not propagate energy over a long distance, the resonance method can transmit electric power with less energy loss, when compared with an electromagnetic wave which transmits energy (electric power) using the "radiation electromagnetic field" which propagates energy over a long distance.

Figure 8:
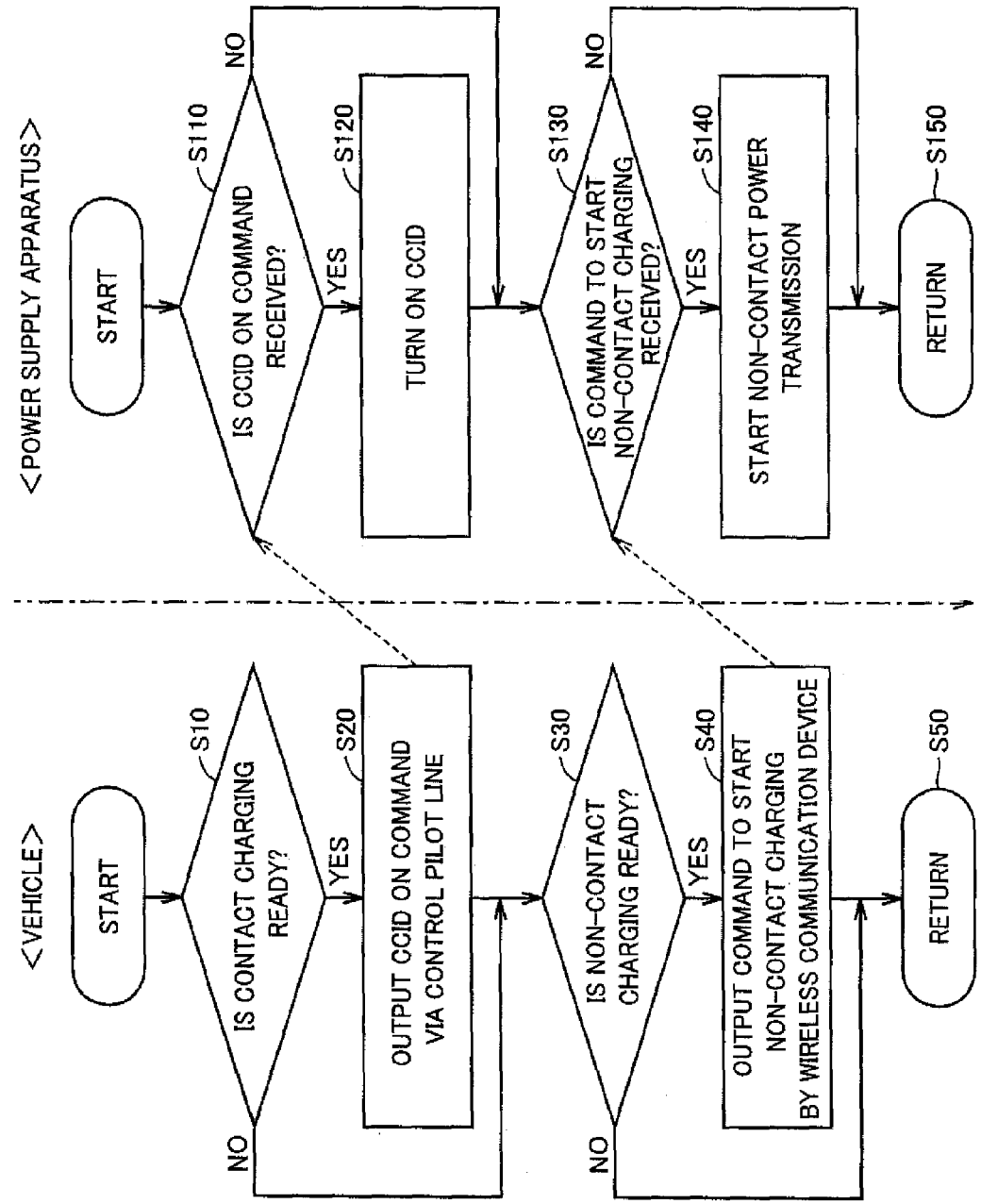
FIG. 8 is a flowchart for illustrating a schematic processing procedure for charging the vehicle by the power supply apparatus.

FIG. 8 is a flowchart for illustrating a schematic processing procedure for charging vehicle 10 by power supply apparatus 100. Referring to FIG. 8, in vehicle 10, first ECU 55 determines whether or not the contact charging is ready (step S10). For example, when connection between charging inlet 40 and connector 120 of the charging cable is sensed and input of pilot signal CPLT is sensed, first ECU 55 determines that the contact charging is ready.

When it is determined that the contact charging is ready (YES in step S10), first ECU 55 notices EVSE 115 of a CCID ON command via the control pilot line, by manipulating the potential of pilot signal CPLT. When the contact charging is not ready (NO in step S10), the processing is moved to step S30.

Subsequently, second ECU 90 determines whether or not the non-contact charging is ready (step S30). For example, when the adjustment control such as alignment between power reception unit 70 and power transmission unit 140 and impedance matching therebetween by matching box 135 is completed, second ECU 90 determines that the non-contact charging is ready.

When it is determined that the non-contact charging is ready (YES in step S30), second ECU 90 outputs a command to start the non-contact charging for charging power storage device 12 by outside power source 130, to power supply apparatus 100, by second communication device 95.

On the other hand, in power supply apparatus 100, when it is determined that the CCID ON command is received from vehicle 10 based on the potential of pilot signal CPLT (YES in step S110), CCID 235 is turned on in EVSE 115 (step S120). Thereby, electric power is supplied from outside power source 110 to vehicle 10 via the charging cable, and the contact charging is performed.

Subsequently, third ECU 145 determines whether or not the command to start the non-contact charging is received by fourth communication device 150 (step S130). Then, when it is determined that the command to start the non-contact charging is received (YES in step S130), third ECU 145 starts the non-contact electric power transmission transmitting electric power from power transmission unit 140 to power reception unit 70 in the non-contact manner (step S140).

It is noted that, although first ECU 55 which controls the contact charging and second ECU 90 which controls the non-contact charging are configured separately in the above description, first ECU 55 and second ECU 90 may be configured as one ECU. Further, in power supply apparatus 100, third ECU 145 may be configured to be separated into an ECU which controls the contact charging and an ECU which controls the non-contact charging.

As described above, in Embodiment 1, provided are first communication device 60 and third communication device 125 for communicating the contact charging information about the contact charging between vehicle 10 and power supply apparatus 100, and second communication device 95 and fourth communication device 150 for communicating the non-contact charging information about the non-contact charging between vehicle 10 and power supply apparatus 100. Therefore, according to Embodiment 1, efficient communication can be established between vehicle 10 and power supply apparatus 100 in accordance with charging means (contact charging and/or non-contact charging) used, a charging environment, and the like.

In addition, in Embodiment 1, when charging is performed using either one charging means of the contact charging and the non-contact charging, there is no need to use communication means corresponding to the other charging means. Therefore, according to Embodiment 1, a contact charging system including first communication device 60 and third communication device 125 and a non-contact charging system including second communication device 95 and fourth communication device 150 can be operated individually. Specifically, when only the contact charging is performed, there is no need to start up the non-contact charging system including second communication device 95 and fourth communication device 150, and when only the non-contact charging is performed, there is no need to start up the contact charging system including first communication device 60 and third communication device 125.

Further, in Embodiment 1, when power supply from power supply apparatus 100 to vehicle 10 is performed using both of the contact charging and the non-contact charging, the information which is in common with each other in the contact charging information and the non-contact charging information (i.e., common information) is communicated using only one of the communication using first communication device 60 and third communication device 125 (PLC) and the wireless communication using second communication device 95 and fourth communication device 150. Therefore, according to Embodiment 1, a reduction in communication speed caused by communicating overlapping contents between vehicle 10 and power supply apparatus 100 can be prevented.

Furthermore, in Embodiment 1, when power supply from power supply apparatus 100 to vehicle 10 is performed using both of the contact charging and the non-contact charging, the common information is communicated using communication means having a faster communication speed, of the communication using first communication device 60 and third communication device 125 (PLC) and the wireless communication using second communication device 95 and fourth communication device 150. Therefore, according to Embodiment 1, the efficiency of communication between vehicle 10 and power supply apparatus 100 can be further improved.

[Embodiment 2]

In Embodiment 1 described above, the information which is in common in the contact charging information and the non-contact charging information (i.e., common information) is communicated using communication means having a faster communication speed, of the communication using first communication device 60 and third communication device 125 (PLC) and the wireless communication using second communication device 95 and fourth communication device 150.

In Embodiment 2, the common information is also communicated with being contained in each of the contact charging information and the non-contact charging information. In addition, when communication is performed between vehicle 10 and power supply apparatus 100 using both of the communication using first communication device 60 and third communication device 125 (PLC) and the wireless communication using second communication device 95 and fourth communication device 150, and the common information contained in the contact charging information is different from the common information contained in the non-contact charging information, it is determined that a communication status is abnormal, and a warning indicating abnormality is output.

The overall configuration of a vehicle charging system in accordance with Embodiment 2 is the same as that of the vehicle charging system in accordance with Embodiment 1 shown in FIG. 1.

Figure 9:
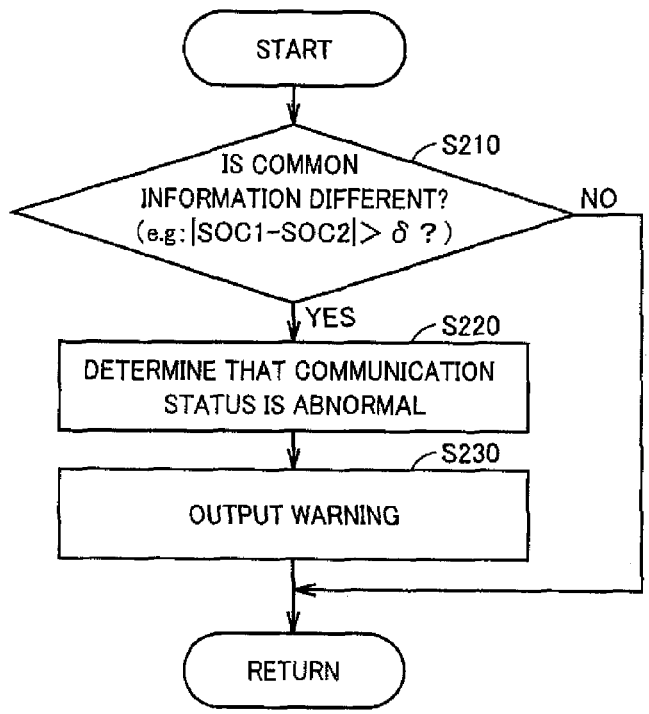
FIG. 9 is a flowchart for illustrating a processing procedure for determining that a communication status is abnormal in Embodiment 2.

FIG. 9 is a flowchart for illustrating a processing procedure for determining that a communication status is abnormal in Embodiment 2. Referring to FIG. 9, first ECU 55 (or second ECU 90 or third ECU 145; hereinafter the same applies) determines whether or not the common information contained in the contact charging information is different from the common information contained in the non-contact charging information (step S210). As an example, when a difference between an SOC1 indicating the SOC of power storage device 12, which is the common information contained in the contact charging information, and an SOC2 indicating the SOC of power storage device 12, which is the common information contained in the non-contact charging information, is greater than a predetermined value δ, it is determined that the common information is different.

When it is determined in step S210 that the common information is different (YES in step S210), first ECU 55 determines that the communication status is abnormal (step S220). It is noted that "abnormality of the communication status" includes various abnormalities such as abnormality of vehicle 10, abnormality of power supply apparatus 100, abnormality of a communication environment in which communication is performed, and the like. Thereafter, first ECU 55 outputs a warning indicating that the communication status is abnormal, to a user (step S230).

As described above, according to Embodiment 2, abnormality of the communication status can be sensed using the common information.

[Variation]

Figure 10:
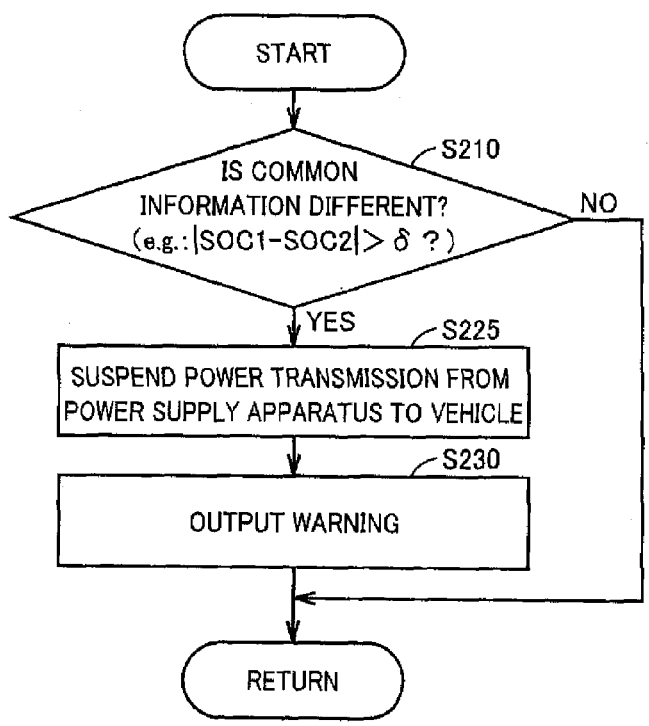
FIG. 10 is a flowchart for illustrating a processing procedure for determining that a communication status is abnormal in a variation of Embodiment 2.

FIG. 10 is a flowchart for illustrating a processing procedure for determining that a communication status is abnormal in a variation of Embodiment 2. Referring to FIG. 10, the flowchart includes step S225 instead of step S220 in the flowchart shown in FIG. 9. Specifically, when it is determined in step S210 that the common information is different (YES in step S210), it is determined that the communication status is abnormal, and power transmission from power supply apparatus 100 to vehicle 10 is suspended (step S225). Namely, all of the contact charging and the non-contact charging are suspended. Thereafter, the processing is moved to step S230.

In this variation, when the common information is different, power transmission from power supply apparatus 100 to vehicle 10 is suspended. It is noted that suspension of power transmission from power supply apparatus 100 to vehicle 10 is because it is determined that the communication status is abnormal based on the common information, and power transmission suspension processing in step S225 is included in determining that the communication status is abnormal.

As described above, also according to this variation, abnormality of the communication status can be sensed using the common information.

[Embodiment 3]

In Embodiment 1, the information which is in common in the contact charging information and the non-contact charging information (i.e., common information) is communicated using communication means having a faster communication speed, of the communication using first communication device 60 and third communication device 125 (PLC) and the wireless communication using second communication device 95 and fourth communication device 150.

In Embodiment 3, information other than the charging information, which is not contained in any of the contact charging information and the non-contact charging information, is communicated using one of the communication using first communication device 60 and third communication device 125 (PLC) and the wireless communication using second communication device 95 and fourth communication device 150. Preferably, communication is performed using communication means having a faster communication speed.

The overall configuration of a vehicle charging system in accordance with Embodiment 3 is the same as that of the vehicle charging system in accordance with Embodiment 1 shown in FIG. 1.

FIG. 11 is a view showing exemplary information communicated between vehicle 10 and power supply apparatus 100 in Embodiment 3. Referring to FIG. 11, the contact charging information contains not only the contact charging information in Embodiment 1 shown in FIG. 2, but also, for example, the SOC of power storage device 12 and information on the power supply apparatus 100 side (rated output, state, and the like). Further, the non-contact charging information contains not only the non-contact charging information in Embodiment 1 shown in FIG. 2, but also, for example, the SOC of power storage device 12 and information on the power supply apparatus 100 side (rated output, state, and the like).

The information other than the charging information (hereinafter also referred to as "other information"), which is not contained in any of the contact charging information and the non-contact charging information, contains, for example, music information, map information, vehicle maintenance information, billing information, vehicle identification information (ID information), Internet information, and the like. It is noted that, specifically, the "other information" is information other than information about power reception by vehicle 10 from power supply apparatus 100, or information other than information about power transmission from power supply apparatus 100 to vehicle 10.

In addition, when power supply from power supply apparatus 100 to vehicle 10 is performed using both of the contact charging and the non-contact charging, the "other information" is communicated between vehicle 10 and power supply apparatus 100 using one of the PLC by first communication device 60 and third communication device 125 and the wireless communication by second communication device 95 and fourth communication device 150 which has a faster communication speed. It is noted that at least a portion of the "other information" may be communicated using only one of the PLC by first communication device 60 and third communication device 125 and the wireless communication by second communication device 95 and fourth communication device 150.

When only the contact charging is performed, the "other information" is communicated using the PLC by first communication device 60 and third communication device 125, together with the contact charging information. When only the non-contact charging is performed, the "other information" is wirelessly communicated by second communication device 95 and fourth communication device 150, together with the non-contact charging information.

In Embodiment 3, when power supply from power supply apparatus 100 to vehicle 10 is performed using both of the contact charging and the non-contact charging, the "other information" not contained in any of the contact charging information and the non-contact charging information is communicated using only one of the communication using first communication device 60 and third communication device 125 (PLC) and the wireless communication using second communication device 95 and fourth communication device 150. Therefore, according to Embodiment 3, a reduction in communication speed caused by communicating overlapping contents between vehicle 10 and power supply apparatus 100 can be prevented.

Further, in Embodiment 3, when power supply from power supply apparatus 100 to vehicle 10 is performed using both of the contact charging and the non-contact charging, the "other information" is communicated using communication means having a faster communication speed, of the communication using first communication device 60 and third communication device 125 (PLC) and the wireless communication using second communication device 95 and fourth communication device 150. Therefore, according to Embodiment 3, the efficiency of communication between vehicle 10 and power supply apparatus 100 can be further improved.

[Variation]

The "other information" described above may be communicated between vehicle 10 and the outside of the vehicle by communication means other than first communication device 60 and third communication device 125 used for the contact charging, and second communication device 95 and fourth communication device 150 used for the non-contact charging.

FIG. 12 is a view showing exemplary information communicated between vehicle 10 and the outside of the vehicle in this variation. Referring to FIG. 12, the "other information" not contained in any of the contact charging information and the non-contact charging information is communicated between vehicle 10 and the outside of the vehicle, by means other than the PLC by first communication device 60 and third communication device 125 and the wireless communication by second communication device 95 and fourth communication device 150, for example, by the GSM (registered trademark) (Global System for Mobile communications), a LAN (Local Area Network), or the like. It is noted that each of the contact charging information, the non-contact charging information, and the "other information" is identical to each information in Embodiment 3 shown in FIG. 11.

In this variation, concerning the "other information" not contained in any of the contact charging information and the non-contact charging information, data can be exchanged between vehicle 10 and the outside of the vehicle (such as an outside server) without passing through power supply apparatus 100. Therefore, according to this variation, the communication speed between vehicle 10 and power supply apparatus 100 can be maintained.

[Embodiment 4]

In each of the embodiments described above, in vehicle 10, a circuit which implements the non-contact charging (i.e., a circuit composed of power reception unit 70, rectifier 75, and sensor unit 80; hereinafter also referred to as a "non-contact charging circuit") is connected in parallel to a circuit which implements the contact charging (i.e., a circuit composed of charging inlet 40 and charger 45; hereinafter also referred to as a "contact charging circuit"). However, the non-contact charging circuit may be connected to the charger of the contact charging circuit.

Figure 13:
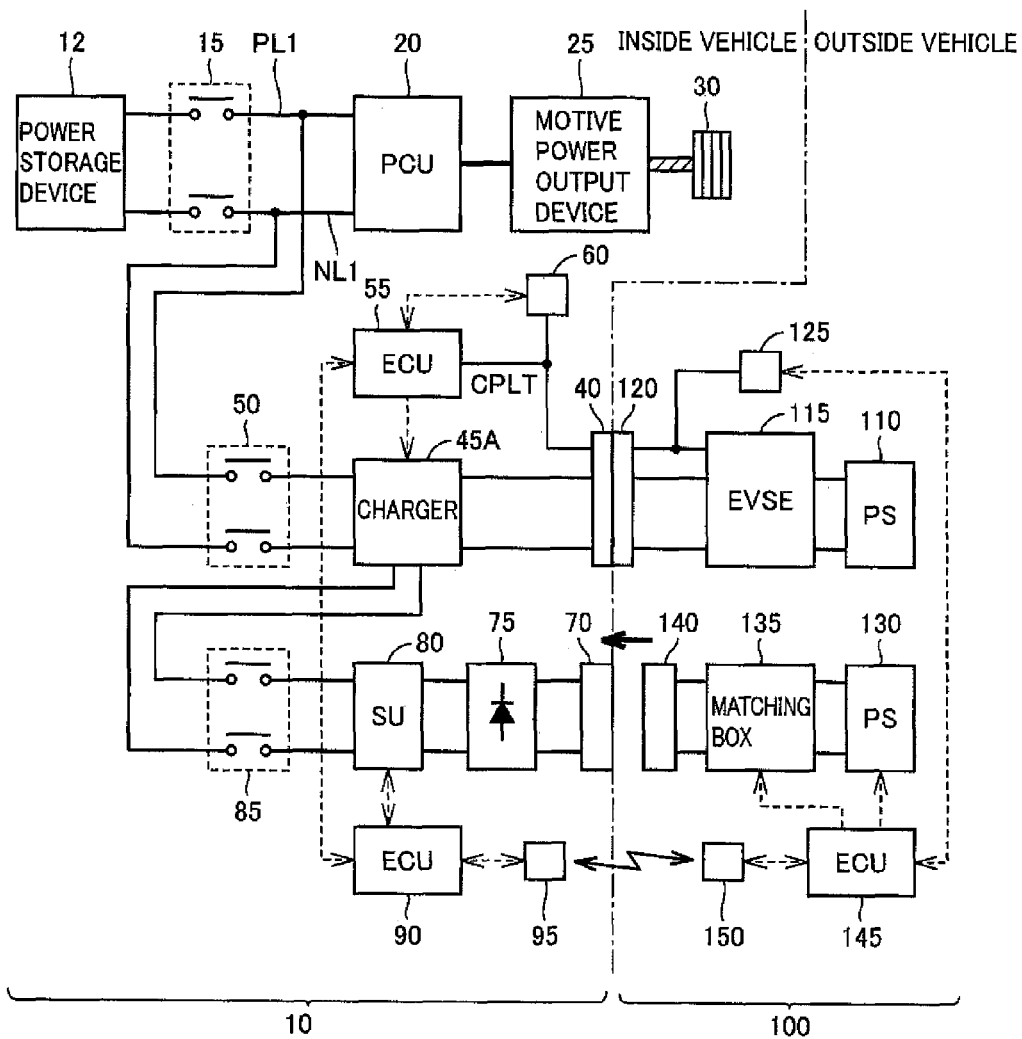
FIG. 13 is an overall configuration diagram of a vehicle charging system in accordance with Embodiment 4.

FIG. 13 is an overall configuration diagram of a vehicle charging system in accordance with Embodiment 4. Referring to FIG. 13, a vehicle 10A in the vehicle charging system includes a charger 45A instead of charger 45 in the configuration of vehicle 10 shown in FIG. 1. In addition, in Embodiment 4, second charging relay 85 is provided between sensor unit 80 and charger 45A to electrically connect/disconnect sensor unit 80 to/from charger 45A. Other than that, the configuration of vehicle 10A is identical to that of vehicle 10 shown in FIG. 1.

Figure 14:
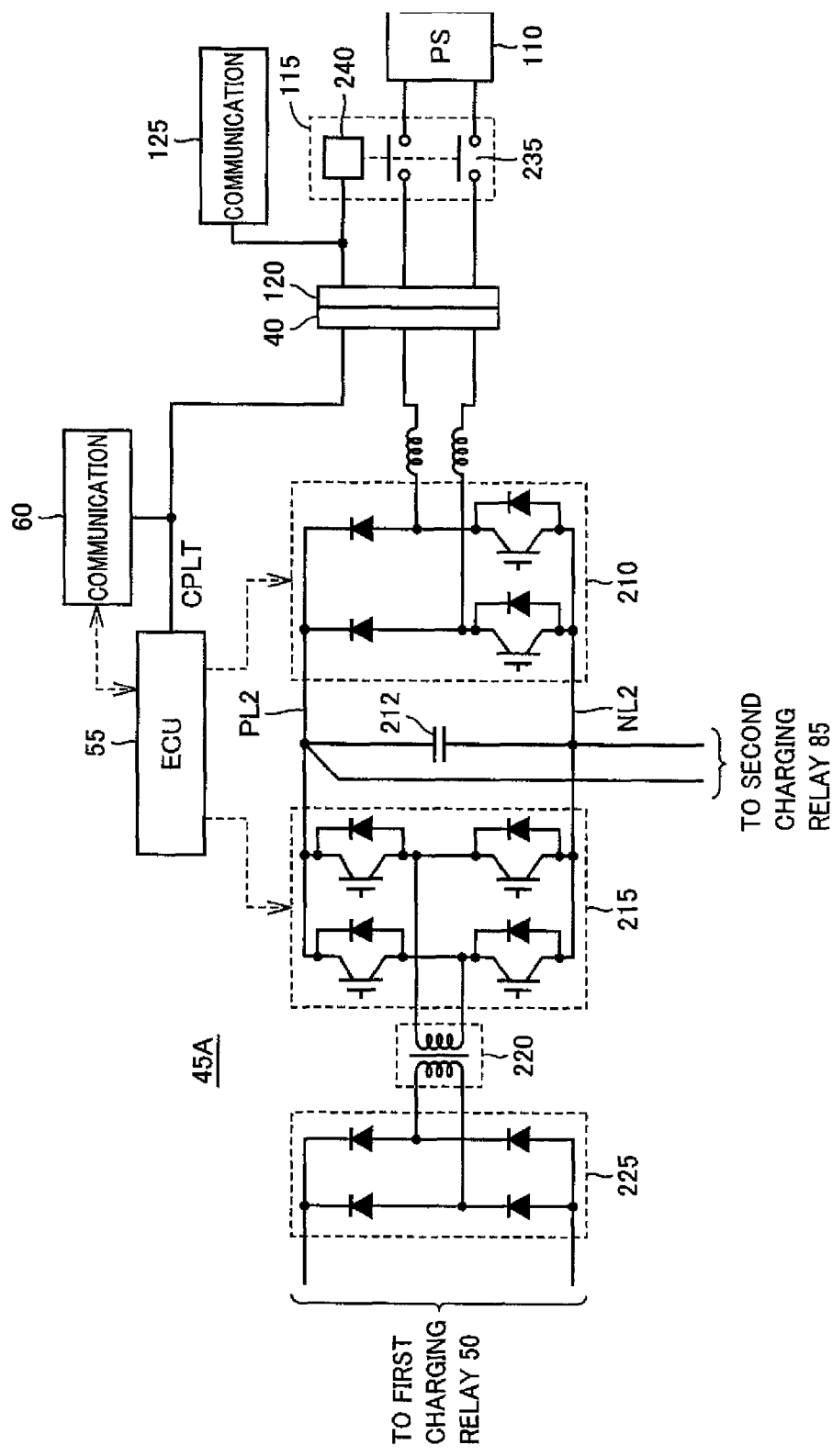
FIG. 14 is a circuit diagram of a charger shown in FIG. 13.

FIG. 14 is a circuit diagram of charger 45A shown in FIG. 13. Referring to FIG. 14, the circuit configuration of charger 45A is basically identical to that of charger 45 shown in FIG. 3, and power lines from second charging relay 85 are connected to a positive electrode line PL2 and a negative electrode line NL2 between AC/DC conversion unit 210 and DC/AC conversion unit 215.

Positive electrode line PL2 and negative electrode line NL2 are DC link lines supplying DC power from AC/DC conversion unit 210 to DC/AC conversion unit 215, and an output (DC) of the non-contact charging circuit is connected to the DC link lines. Then, output power of the non-contact charging circuit is output to power storage device 12 via DC/AC conversion unit 215, insulating transformer 220, and rectification unit 225 of charger 45A.

Also according to Embodiment 4, the same effect as that in each of the embodiments described above is obtained. In addition, according to Embodiment 4, since the output of the non-contact charging circuit is connected to the primary side of insulating transformer 220 of charger 45A, the non-contact charging circuit can be insulated from main circuits such as power storage device 12, PCU 20, and the like.

It is noted that, although electric power is transmitted from power transmission unit 140 to power reception unit 70 in the non-contact manner by resonating power transmission unit 140 of power supply apparatus 100 (on the primary side) and power reception unit 70 of vehicle 10 (on the secondary side) by an electromagnetic field in each of the embodiments described above, electric power may be transmitted from power transmission unit 140 to power reception unit 70 in the non-contact manner by electromagnetic induction. When electric power transmission is performed between power transmission unit 140 and power reception unit 70 by electromagnetic induction, coupling coefficient κ between power transmission unit 140 and power reception unit 70 has a value close to 1.0.

It is noted that, in the above description, charging inlet 40 and charger 45 (45A) form one embodiment of a "first power reception unit" in the present invention, and power reception unit 70 corresponds to one embodiment of a "second power reception unit" in the present invention. Further, first communication device 60 corresponds to one embodiment of a "first communication unit" in the invention of a vehicular power reception device, and second communication device 95 corresponds to one embodiment of a "second communication unit" in the invention of a vehicular power reception device. Furthermore, first ECU 55 and second ECU 90 correspond to one embodiment of a "control unit" in the invention of a vehicular power reception device.

In addition, EVSE 115 and connector 120 form one embodiment of a "first power transmission unit" in the present invention, and power transmission unit 140 corresponds to one embodiment of a "second power transmission unit" in the present invention. Further, third communication device 125 corresponds to one embodiment of a "first communication unit" in the invention of a power supply apparatus, and fourth communication device 150 corresponds to one embodiment of a "second communication unit" in the invention of a power supply apparatus. Furthermore, third ECU 145 corresponds to one embodiment of a "control unit" in the invention of a power supply apparatus.

It should be understood that the embodiments disclosed herein are illustrative and non-restrictive in every respect. The scope of the present invention is defined by the scope of the claims, rather than the above description of the embodiments, and is intended to include any modifications within the scope and meaning equivalent to the scope of the claims.

REFERENCE SIGNS LIST

10: vehicle; 12: power storage device; 15: SMR; 20: PCU; 25: motive power output device; 30: drive wheel; 40: charging inlet; 45, 45A: charger; 50: first charging relay; 55: first ECU; 60: first communication device; 70: power reception unit; 75: rectifier; 80: sensor unit; 85: second charging relay; 90: second ECU; 95: second communication device; 100, 100A: power supply apparatus; 110, 130: outside power source; 115: EVSE; 120: connector; 125: third communication device; 135: matching box; 140: power transmission unit; 145: third ECU; 150: fourth communication device; 210: AC/DC conversion unit; 215: DC/AC conversion unit; 220: insulating transformer; 225: rectification unit; 235: CCID; 240: CPLT control device; 310, 315: variable capacitor; 320, 325, 330, 340, 350: coil; 335, 345: capacitor; 355: relay; 360: adjustment resistor; 365, 370: voltage sensor; 375: current sensor; PL1, PL2: positive electrode line; NL1, NL2: negative electrode line; L1 to L6: power line.

The invention claimed is:

1. A vehicular power reception device for receiving electric power from a power source outside a vehicle, comprising:

a first power reception unit receiving the electric power from said power source via a power line;

a second power reception unit receiving the electric power from said power source in a non-contact manner;

a first communication unit for communicating first information about power reception by said first power reception unit with an outside of the vehicle;

a second communication unit for communicating second information about power reception by said second power reception unit with the outside of the vehicle; and, a control unit controlling said first and second communication units, when power reception from said power source is performed using both of said first and second power reception units, to communicate common information with the outside of the vehicle using only one of said first and second communication units, said common information being information in common with each other in information contained in said first information and information contained in said second information.

2. A vehicular power reception device for receiving electric power from a power source outside a vehicle, comprising:

a first power reception unit receiving the electric power from said power source via a power line;

a second power reception unit receiving the electric power from said power source in a non-contact manner;

a first communication unit for communicating first information about power reception by said first reception unit with an outside of the vehicle;

a second communication unit for communicating second information about power reception by said second power reception unit with the outside of the vehicle; and a control unit controlling said first and second communication units, when communication with the outside of the vehicle is performed using both of said first and second communication units, to communicate common information with the outside of the vehicle using only one of said first and second communication units, said common information being information in common with each other in information contained in said first information and information contained in said second information.

3. The vehicular power reception device according to claim 1, wherein said control unit controls said first and second communication units to communicate said common information with the outside of the vehicle using one of said first and second communication units having a faster communication speed.

4. A vehicular power reception device for receiving electric power from a power source outside a vehicle, comprising;

a first power reception unit receiving the electric power from said power source via a power line;

a second power reception unit receiving the electric power from said power source in a non-contact manner, a first communication unit for communicating first information about power reception by said first power reception unit with an outside of the vehicle;

a second communication unit for communicating second information about power reception by said second power reception unit with the outside of the vehicle; and a control unit determining that a status of communication with the outside of the vehicle is abnormal when, concerning common information which is in common with each other in information contained in said first information and information contained in said second information, contents of said common information contained in said first information are different from contents of said common information contained in said second information in a case where the communication with the outside of the vehicle is performed using both of said first and second communication units.

5. The vehicular power reception device according to claim 1, wherein said control unit controls said first and second communication units, when power reception from said power source is performed using both of said first and second power reception units, to communicate information other than information about the power reception from said power source with the outside of the vehicle using only one of said first and second communication units.

6. The vehicular power reception device according to claim 5, wherein said control unit controls said first and second communication units to communicate the information other than the information about the power reception from said power source with the outside of the vehicle using one of said first and second communication units having a faster communication speed.

7. The vehicular power reception device according to claim 1, wherein said first communication unit communicates with the outside of the vehicle via said power line, and said second communication unit wirelessly communicates with the outside of the vehicle.

8. The vehicular power reception device according to claim 1, wherein information communicated by said first communication unit is different from information communicated by said second communication unit.

9. The vehicular power reception device according to claim 1, wherein said control unit controls said first and second communication units to communicate with the outside of the vehicle using only said first communication unit when power reception from said power source is performed using only said first power reception unit, and to communicate with the outside of the vehicle using only said second communication unit when the power reception from said power source is performed using only said second power reception unit.

10. The vehicular power reception device according to 1, wherein said power source includes a power transmission unit transmitting the electric power to said second power reception unit in the non-contact manner, and a difference between a natural frequency of said second power reception unit and a natural frequency of said power transmission unit is less than or equal to ±10% of the natural frequency of said second power reception unit or the natural frequency of said power transmission unit.

11. The vehicular power reception device according to 1, wherein said power source includes a power transmission unit transmitting the electric power to said second power reception unit in the non-contact manner, and a coupling coefficient between said second power reception unit and said power transmission unit is less than or equal to 0.1.

12. The vehicular power reception device according to claim 1, wherein said power source includes a power transmission unit transmitting the electric power to said second power reception unit in the non-contact manner, and said second power reception unit receives the electric power from said power transmission unit through at least one of a magnetic field and an electric field, said magnetic field being formed between said second power reception unit and said power transmission unit and oscillating at a specific frequency, said electric field being formed between said second power reception unit and said power transmission unit and oscillating at a specific frequency.

13. A vehicle equipped with the vehicular power reception device according to claim 1.

14. A power supply appartus for supplying electric power to a vehicle, comprising:
- a first power transmission unit transmitting the electric power to said vehicle via a power line;
- a second power transmission unit transmitting the electric power to said vehicle in a non-contact manner;
- a first communication unit for communicating first information about power transmission by said first power transmission unit with said vehicle;
- a second communication unit for communicating second information about power transmission by said second power transmission unit with said vehicle; and
- a control unit controlling said first and second communication units, when power transmission to said vehicle is performed using both of said first and second power transmission units, to communicate common information with said vehicle using only one of said first and second communication units, said common information being information in common with each other in information contained in said first information and information contained in said second information.

15. A power supply apparatus for supplying electric power to a vehicle, comprising:
- a first power transmission unit transmitting the electric power to said vehicle via a power line;
- a second power transmission unit transmitting the electric power to said vehicle in a non-contact manner;
- a first communication unit for communicating first information about power transmission by said first .power transmission unit with said vehicle;
- a second communication unit for communicating second information about power transmission by said second power transmission unit with said vehicle; and
- a control unit controlling said first and second communication units, when communication with said vehicle is performed using both of said first and second communication units, to communicate common information with said vehicle using only one of said first and second communication units, said common information being information in common with each other in information contained in said first information and information contained in said second information.

16. The power supply apparatus according to claim 14, wherein said control unit controls said first and second communication units to communicate said common information with said vehicle using one of said first and second communication units having a faster communication speed.

17. A power supply apparatus for supplying electric power to a vehicle, comprising:
- a first power transmission unit transmitting the electric power to said vehicle via a power line;
- a second power transmission unit transmitting the electric power to said vehicle in a non-contact manner;
- a first communication unit for communicating first information about power transmission by said first power transmission unit with said vehicle;
- a second communication unit for communicating second information about power transmission by said second power transmission unit with said vehicle; and
- a control unit determining that a status of communication with said vehicle is abnormal when, concerning common information which is in common with each other in information contained in said first information and information contained in said second information, contents of said common information contained in said first information are different from contents of said common information contained in said second information in a case where the communication with said vehicle is performed using both of said first and second communication units.

18. The power supply apparatus according to claim 14, wherein said control unit controls said first and second communication units, when power transmission to said vehicle is performed using both of said first and second power transmission units, to communicate information other than information about the power transmission to said vehicle with said vehicle using only one of said first and second communication units.

19. The power supply apparatus according to claim 18, wherein said control unit controls said first and second communication units to communicate the information other than the information about the power transmission to said vehicle with said vehicle using one of said first and second communication units having a faster communication speed.

20. The power supply apparatus according to claim 14, wherein
- said first communication unit communicates with said vehicle via said power line, and
- said second communication unit wirelessly communicates with said vehicle.

21. The power supply apparatus according to claim 14, wherein information communicated by said first communication unit is different from information communicated by said second communication unit.

22. The power supply apparatus according to claim 14, wherein said control unit controls said first and second communication units to communicate with said vehicle using only said first communication unit when power transmission to said vehicle is performed using only said first power transmission unit, and to communicate with said vehicle using only said second communication unit when the power transmission to said vehicle is performed using only said second power transmission unit.

23. The power supply apparatus according to claim 14, wherein
- said vehicle includes a power reception unit receiving the electric power from said second power transmission unit in the non-contact manner, and
- a difference between a natural frequency of said second power transmission unit and a natural frequency of said power reception unit is less than or equal to ±10% of the natural frequency of said second power transmission unit or the natural frequency of said power reception unit.

24. The power supply apparatus according to claim 14, wherein
- said vehicle includes a power reception unit receiving the electric power from said second power transmission unit in the non-contact manner, and
- a coupling coefficient between said second power transmission unit and said power reception unit is less than or equal to 0.1.

25. The power supply apparatus according to claim 14, wherein
- said vehicle includes a power reception unit receiving the electric power from said second power transmission unit in the non-contact manner, and
- said second power transmission unit transmits the electric power to said power reception unit through at least one of a magnetic field and an electric field, said magnetic field being formed between said second power transmission unit and said power reception unit and oscillating at a specific frequency, said electric field being formed between said second power transmission unit and said power reception unit and oscillating at a specific frequency.

* * * * *